June 6, 1950 F. E. HUMMEL 2,510,114
DRILL PIPE WIPER
Filed Feb. 8, 1946

Inventor
Fred E. Hummel
By Lyon & Lyon
Attorneys

Patented June 6, 1950

2,510,114

UNITED STATES PATENT OFFICE 2,510,114

DRILL PIPE WIPER

Fred E. Hummel, Long Beach, Calif.

Application February 8, 1946, Serial No. 646,379

5 Claims. (Cl. 166—16)

My invention relates to drill pipe wipers, and among the objects of my invention are:

First: To provide a drill pipe wiper through which all kinds of pipe, casing, tubing or sucker rods may be readily moved into, or out of, a well, while the wiper maintains itself in engagement with the pipe to effectively wipe or strip fluids from the surface thereof.

Second: To provide a drill pipe wiper which permits movement of the pipe or the like in either direction without adjustment of the wiper, and, in particular, permits the short reversals of movement incidental to setting and unsetting the slips employed in the course of raising or lowering a string of pipe in a well bore.

Third: To provide a drill pipe wiper wherein one size is capable of passing, without adjustment or change, a wide range of pipe sizes.

Fourth: To provide a drill pipe wiper which is particularly compact and economical of manufacture.

With the foregoing and other objects in view, as may appear hereinafter, reference is directed to the accompanying drawings, in which.

Figure 1:
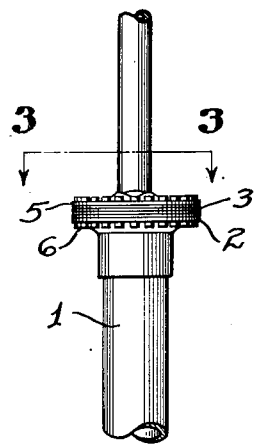
Fig. 1 is a fragmentary view of a casing head equipped with my drill pipe wiper.
Figure 2:
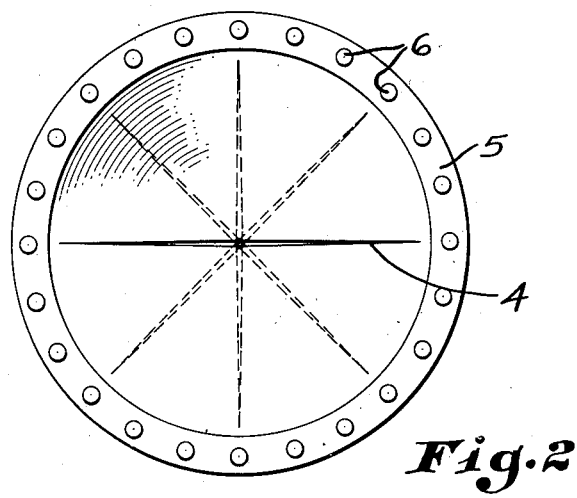
Fig. 2 is an enlarged plan view of my drill pipe wiper assembled but without the drill pipe inserted therein.

A well casing designated 1 is provided with an adapter flange 2 on which is stacked a series of wiper disks 3.

Each wiper disk is formed from a circular sheet of flexible material, preferably "synthetic" rubber or the like, which may or may not contain laminations of woven fabric or similar flexible reenforcement. Each wiper disk is provided with a diametrically extending slit 4. The slit is preferably two to three times as long as the diameter of the largest pipe size to be used. For example, a disk having a slit of approximately sixteen inches may be employed satisfactorily in the handling of pipe ranging from four and one-half inches outside diameter down to sucker rod size.

The wiper disks 3 are stacked in such a manner that the various slits 4 radiate in different directions. The disposition and number of slits are preferably such that a symmetrical arrangement may be obtained. That is, if four wiper disks are employed, the slits may be arcuately offset forty-five degrees from each other. In such case it is preferred to offset each disk forty-five degrees from its predecessor, so that they define a helix.

The margins of the stack of disks are held by a clamping ring 5 and rivets or bolts 6 which connect the clamping ring to the adapter flange 2. A relatively large number of bolts or rivets are employed, so that the peripheries of the several disks are firmly held.

Figure 3:
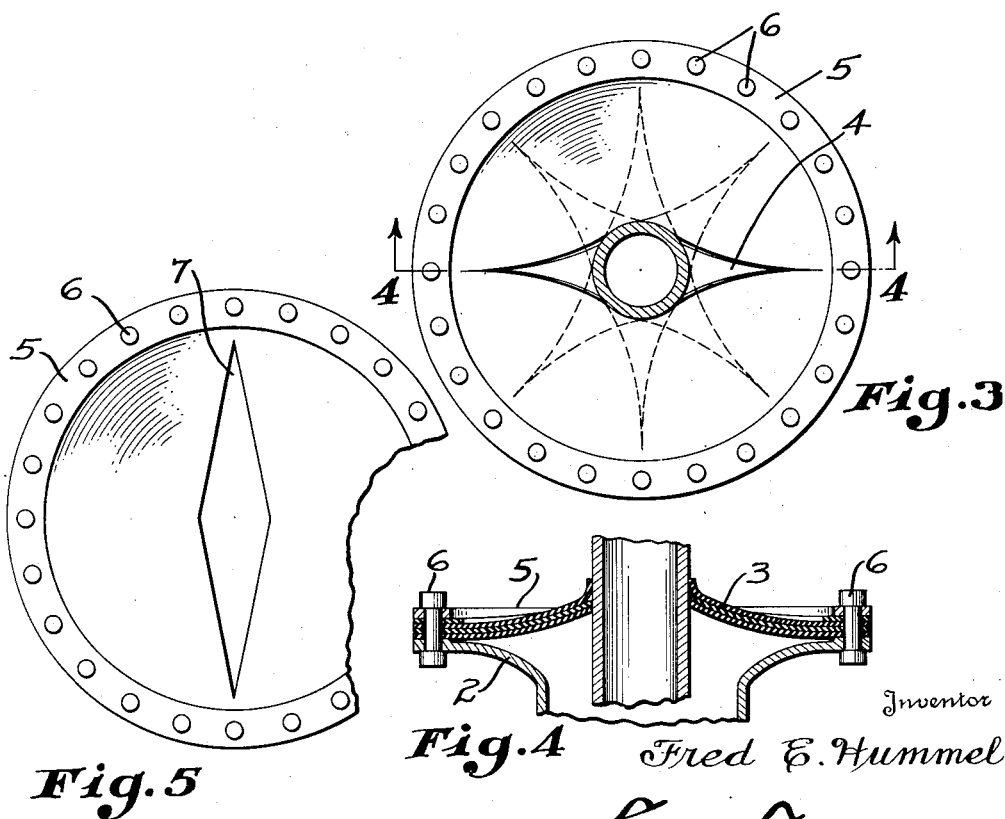
Fig. 3 is a similar plan view of the drill pipe wiper illustrating the manner in which it fits around a drill pipe, the view being taken from 3—3 of Fig. 1.

When a drill pipe or the like is thrust downwardly or upwardly through the stack of disks, their central portions deflect and cause the slits 4 to spread so as to form an opening capable of admitting and passing the drill pipe or the like, as shown in Fig. 3. Each slit, in flexing upwardly to admit the pipe, contacts the pipe for a limited portion of its periphery. The arcuate line of contact of each slit subtends an angle greater than the angular relationship between the slits. Thus compositely the several disks form a complete annulus yieldably engaging the pipe. The engagement effects a relatively fluid tight seal, so that mud or other well fluids clinging to a pipe as it is raised from the well casing are stripped or wiped from the pipe, and the pipe on emerging through the wiper is relatively clean. In the course of removing a string of pipe, the movement of the pipe must be reversed. That is, the pipe must be lowered a short distance from time to time as each stand is removed from the string of pipe. This repeated reversal renders difficult the problem of maintaining an effective seal around the pipe. However, with the arrangement herein described, this periodic reversal in no way affects the operation of the wiper.

Figure 5:
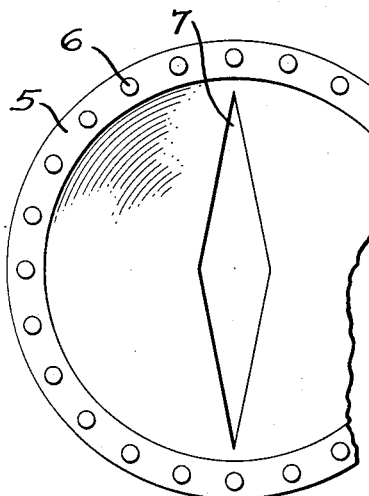
Fig. 5 is a plan view of a single wiper disk arranged to handle larger sizes of pipe.
Figure 4:
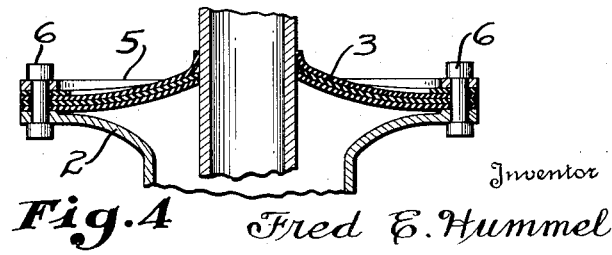
Fig. 4 is a sectional view thereof taken through 4—4 of Fig. 3.

For the smaller sizes of drill pipe casing, tubing and the like, the slits 4 need have little, or no, appreciable width. In order to handle larger sizes of pipes, the slits may be diamond-shaped as indicated by 7 in Fig. 5. The minor diagonal of the diamond-shaped slit is preferably substantially smaller than the pipe that it is intended to admit; for example, a width of three inches in a slit approximately sixteen inches long is satisfactory for pipes ranging upwardly in size from four and one-half inches outside diameter.

It is to be understood that the dimensions given herein are only by way of illustration and not of limitation. Furthermore, although particular reference is made to drill pipe, it should be understood that the wiper may be employed on any type of pipe string, whether drill pipe, casing, tubing, macaroni tubing, sucker rods or the like. By reason of the adaptability of the wiper to varying diameters of pipe, it follows that the wiper readily admits and passes the various tool joints or couplings which connect sections of pipe.

Many other embodiments of the invention may be resorted to without departing from the spirit of the invention.

I claim:

1. A wiper for drill pipe and the like, comprising: a plurality of resilient disks, each having a single, centrally formed diametrical slit, said disks being superposed with the diametrical slits arranged in non-parallel axial planes disposed angularly about the axis of the wiper to provide a multi-leaf, expansible central opening, and means for clamping the peripheries of said disks.

2. A wiper for drill pipe and the like, comprising: a plurality of resilient disks each having a single centrally formed, diametrical slit, the length of which is at least twice the diameter of the drill pipe to be wiped, said disks being superposed with the diametrical slits arranged in non-parallel axial planes disposed angularly about the axis of the wiper, said disks being adapted to stretch along the margins of their openings and deflect axially so as to form a yieldable margin for an opening and press against the sides of a drill pipe, and means for clamping the peripheries of said disks.

3. A wiper for drill pipe and the like, comprising: a plurality of substantially identical disks of resilient material, each having a single centrally formed slit, said disks being superposed with the slits arranged in non-parallel axial planes disposed angularly about the axis of the wiper, each slit being expansible laterally to admit a pipe and to bear thereagainst throughout an arc exceeding the angular spacing of said slits whereby compositely said disks will form a circumferentially complete annulus in yieldable wiping engagement with a pipe thrust therethrough.

4. A wiper for drill pipe and the like comprising: a laminated stack of normally flat, resilient disks, each having a single, centrally formed, diametrical slit, said disks being arranged with the slits lying in non-parallel axial planes disposed angularly about the axis of the wiper, the central portion of said laminated stack being adapted to flex axially to expand the central portions of said slits whereby said disks will compositely form a yieldable annulus adapted to pass a string of pipe and the connecting joints thereof.

5. A wiper for drill pipe and the like comprising: a laminated stack of normally flat, resilient disks, and means for clamping the peripheries of said disks, each of said disks having a single centrally formed, diametrically extending diamond shaped slit, the minor axis of which is less than the diameter of the pipe to be wiped, said disks being arranged with the slits lying in non-parallel axial planes disposed angularly about the axis of the wiper to form compositely an expansible annulus yieldingly engageable with a pipe thrust through the wiper.

FRED E. HUMMEL.

REFERENCES CITED

The following references are of record in the file of this patent:

UNITED STATES PATENTS

| Number | Name | Date |
|---|---|---|
| 1,840,334 | Schuster | Jan. 12, 1932 |
| 1,868,794 | Fuller et al. | July 26, 1932 |
| 2,168,764 | Day | Aug. 8, 1939 |
| 2,215,377 | Penfield et al. | Sept. 17, 1940 |
| 2,255,829 | Spang et al. | Sept. 16, 1941 |